United States Patent
Kang et al.

(10) Patent No.: US 7,911,452 B2
(45) Date of Patent: Mar. 22, 2011

(54) PEN INPUT METHOD AND DEVICE FOR PEN COMPUTING SYSTEM

(75) Inventors: Min-Jeong Kang, Suwon-shi (KR); Han-Il Yu, Songnam-shi (KR); Sung-Chul Yang, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 576 days.

(21) Appl. No.: 10/716,124

(22) Filed: Nov. 18, 2003

(65) Prior Publication Data

US 2004/0100454 A1 May 27, 2004

(30) Foreign Application Priority Data

Nov. 18, 2002 (KR) .......................... 10-2002-0071709

(51) Int. Cl.
*G06F 3/041* (2006.01)
(52) U.S. Cl. .................. 345/173; 345/179; 178/18.01
(58) Field of Classification Search .......... 345/173–179; 178/18.01–18.04, 19.01–19.04
See application file for complete search history.

(56) References Cited

U.S. PATENT DOCUMENTS

| | | | |
|---|---|---|---|
| 5,276,794 A | | 1/1994 | Lamb, Jr. |
| 5,850,477 A | * | 12/1998 | Takada ........................ 382/186 |
| 5,956,034 A | * | 9/1999 | Sachs et al. .................. 715/776 |
| 6,049,329 A | * | 4/2000 | Zetts et al. ................... 345/179 |
| 2004/0160427 A1 | * | 8/2004 | Keely, Jr. et al. ............ 345/179 |

FOREIGN PATENT DOCUMENTS

JP 05-182016 7/1993

* cited by examiner

*Primary Examiner* — Kimnhung Nguyen
(74) *Attorney, Agent, or Firm* — The Farrell Law Firm, P.C.

(57) ABSTRACT

A pen input device and method for a pen computing system. This device includes a touch screen panel mounted on a display screen, an electronic device interfaced with the panel, and a pen for inputting data. When a user handwrites a character, or a symbol on the screen panel, a stream of points is displayed on the touch screen panel to express the handwritten character equivalent to a character handwritten on a paper using a pen. When a user draws a boundary line having a specific shape on the touch screen panel using a pen, the pen input device forms a new entry field inside the boundary line. The user can enter a handwritten character or number in the entry field. In response to this entry, the pen input device converts the entered handwritten character or symbol to a computer text or instruction word. The pen input device also enables the user to determine the attributes and size of the generated entry field.

20 Claims, 4 Drawing Sheets

FIG. 4
(PRIOR ART)

PEN INPUT METHOD AND DEVICE FOR PEN COMPUTING SYSTEM

PRIORITY

This application claims priority to an application entitled "PEN INPUT METHOD AND DEVICE FOR PEN COMPUTING SYSTEM", filed in the Korean Industrial Property Office on Nov. 18, 2002 and assigned Serial No. 2002-71709, the contents of which are hereby incorporated by reference.

BACKGROUND OF THE INVENTION

1. Field of the Invention

The present invention relates to a pen input method and device for a pen computing system.

2. Description of the Related Art

Generally, devices such as a computer, a PDA, and a mobile communication terminal use a physical keypad for inputting text, data, instructions, etc. Recently, in user interfacing methods of such information terminals, a touch screen panel (TSP) is implemented as an object-oriented input of user information. The touch screen panel is currently used as a useful input device in small-sized information terminals such as a PDA or a mobile communication terminal. Inputting user information through the touch screen panel increases the user's convenience significantly, compared with the inputting of user information through the conventional portable terminal's keypad.

In order to serve as information processing equipment, a portable information terminal provides a function of a database, which is a set of data organized in a specific structure for receiving data from a user, storing the data, and providing the data. To this end, conventional portable information terminals provide a database in which entry fields of a fixed size are arranged at fixed positions in a form having a specific format. Such a portable information terminal including a database having fixed-size entry fields was disclosed in U.S. Pat. No. 5,276,794 entitled "POP-UP KEYBOARD SYSTEM FOR ENTERING HANDWRITTEN DATA INTO COMPUTER GENERATED FORM", patented to Arthur C. Lamb, Jr., et al. on Jan. 4, 1994. This prior art describes that a keyboard having a format suitable for each of entry fields of a database pops up and the keyboard includes various kinds of key button regions and display regions.

However, the prior art has the following problems.

First, because the database of the portable information terminal is provided with a specified-format form having a plurality of entry fields whose arrangement and size is fixed, even if an unnecessary entry field exists in the form, the user must use the form as it is, without removing the unnecessary entry field. In this case, because the portable information terminal has a display portion that is relatively small in size, it is usually necessary for the user to use a scroll key, etc., in order to find a target entry field, thereby causing the user inconvenience.

In addition, as illustrated in FIG. 4, when the user handwrites information using an input device such as a stylus 14 on the touch screen panel, the fixed size of the entry field 16a, 16p, and 16q limits the allowable handwriting space, and when the stroke is made outside of the entry field, the handwritten data fails to be correctly recognized. Further, generating of a pop-up window for data entry or a pop-up keyboard associated with the data entry field lowers the processing speed of the portable information terminal and also increases the load of a processor.

SUMMARY OF THE INVENTION

Therefore, the present invention has been designed in view of the above and other problems, and it is an object of the present invention to provide a pen input device and method that enables a user to draw and organize a data entry frame in accordance with the user's desires through a pen input.

It is another object of the present invention to provide a pen input device and method that enables the user to generate a database having required entry fields and manage the generated database through a simple pen input.

It is yet another object of the present invention to provide a pen input device and method that enables the user to freely determine attributes, a number, and a size of each of entry field in a database, and manage the attributes of the entry field according to the type of entry data such as image, text, and character/number.

In accordance with one aspect of the present invention, the above and other objects are accomplished by a pen input device comprising: a touch screen panel for receiving a pen input from a user and displaying input data corresponding to the received pen input; an entry field generating portion for generating one or more entry fields based on a boundary line of an entry frame drawn by the user; a controller for performing a control operation in such a manner that the input data is displayed spatially inside the generated entry field, and the entry field's size is newly set to be suitable for the input data's size; and a memory unit for storing recognition information related to the entry field and the input data according to the control of the controller.

Preferably, the entry field generating portion generates the entry field by smoothing the boundary line of the drawn entry frame based on a previously stored entry frame shape.

Preferably, the entry field has a virtual cell whose size is adjusted to be suitable for the size of the input data.

Preferably, when the input data is handwritten data, the controller detects beginning and end points of its handwritten stroke, and, while modifying the size of the virtual cell at the same time as detecting the handwritten stroke's trace, provides information of a finally modified size of the virtual cell obtained at a time when the end point is detected in the entry field generating portion.

Preferably, the entry field generating portion newly sets the entry field's size based on the information of the size of the virtual cell.

Preferably, in response to a user's request, the controller sets an inherent attribute of each virtual cell of the entry field.

Preferably, the controller duplicates the entry field to generate a page-based database and enables the memory unit to store the page-based database.

Preferably, the inherent attribute defines the entry field to be one of a fixed entry field in which the virtual cell's size and recognized handwritten data cannot be modified by the user, or a reserved entry field in which the virtual cell's size and recognized handwritten data cannot be modified by the user, and defines the type of the entry data such as an image, a text, a character and a number.

Preferably, the controller recognizes the handwritten data of the virtual cell as one stroke group, and converts the recognized handwritten data to computer-recognizable data.

In accordance with another aspect of the present invention, the above and other objects can be accomplished by a pen input method comprising the steps of: (a) displaying an entry frame drawn by a user through a pen input on a touch screen panel; (b) detecting a boundary line of the entry frame, setting an entry field based on the detected boundary line, and generating a virtual cell corresponding to each entry field for entering data; (c) modifying the virtual cell's size in real time in response to entry of data into the virtual cell; and (d) when the entry of data into the virtual cell is completed, newly setting the entry field to be suitable for the modified virtual cell's size.

Preferably, in the step (b), the setting of the entry field is performed by smoothing the detected boundary line based on a previously stored entry frame shape.

Preferably, when the data entered into the virtual cell is handwritten data, the step (c) comprises the steps of:
(c1) detecting beginning and end points of the handwritten data;
(c2) modifying the virtual cell's size while displaying the handwritten data's trace; and
(c3) storing information on the modified virtual cell's size during a period until the end point is detected.

Preferably, the pen input method further comprises the step of: (e) in response to the user's request, setting an inherent attribute of each virtual cell of the entry field.

Preferably, the pen input method further comprises the steps of: (f) in response to the user's request, duplicating the entry field to generate a page-based database; and (g) storing the generated page-based database in a memory.

Preferably, the pen input method further comprises the step of: (h) recognizing handwritten data entered into the virtual cell as one stroke group, and converting the recognized handwritten data to computer-recognizable data.

BRIEF DESCRIPTION OF THE DRAWINGS

The above and other objects, features, and advantages of the present invention will be more clearly understood from the following detailed description taken in conjunction with the accompanying drawings, in which:

Figure 4:
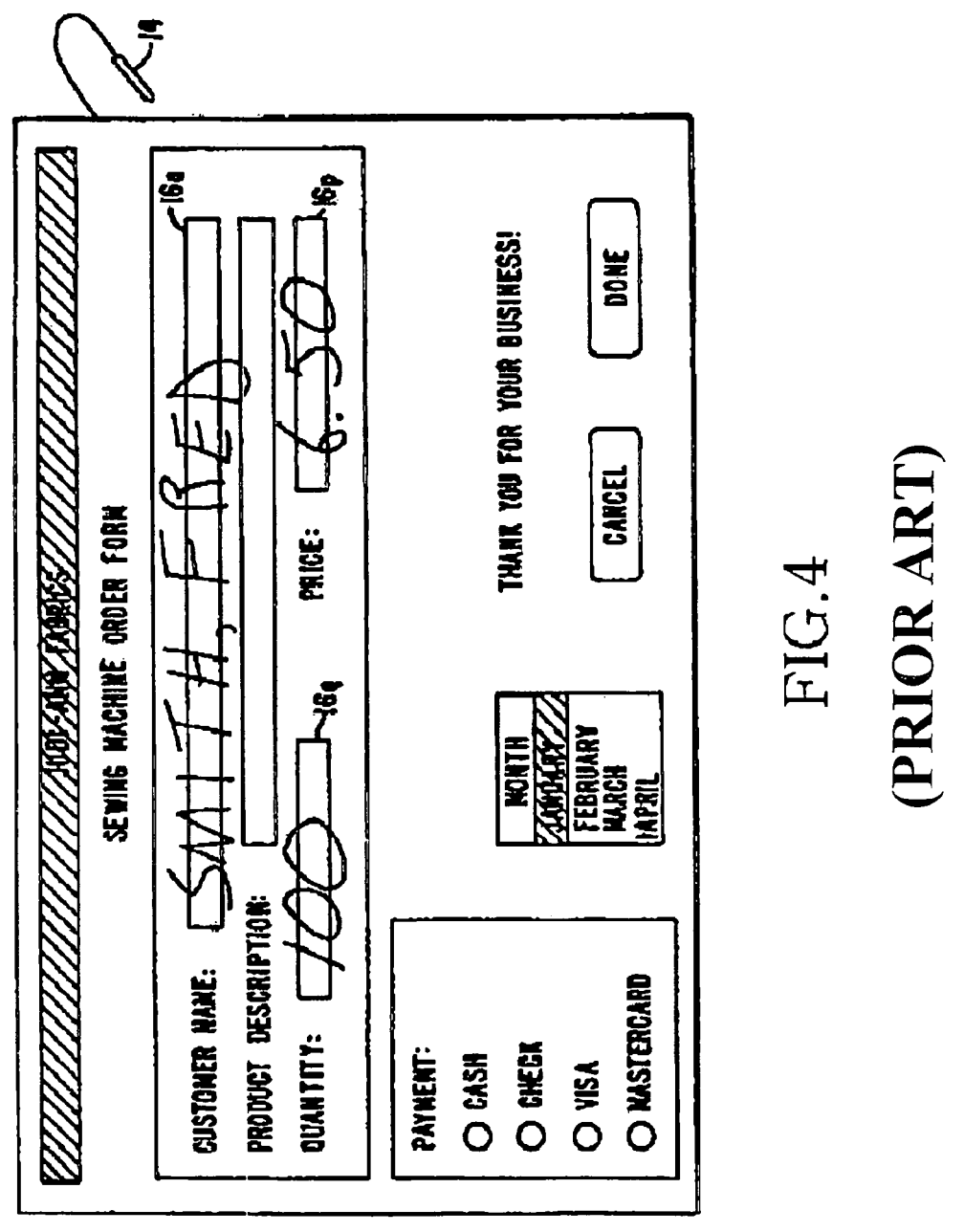

FIG. 4 shows a screen handwritten in the entry field in accordance with a conventional art.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

A pen input device according to the present invention includes a touch screen panel mounted on a display screen, an electronic device interfaced with the touch screen panel, and a pen for inputting data. When a user handwrites a character such as a Roman letter, a Korean "Hangul" character, or a symbol on the touch screen panel, a stream of points is displayed on the touch screen panel to express the handwritten character equivalent to a character handwritten on a paper using a pen. When a user draws a boundary line having a specific shape such as a table, a box, and a circle on the touch screen panel using a pen, the pen input device including the touch screen according to the present invention forms a new entry field inside the drawn boundary line. Accordingly, the user can enter a handwritten character or number in the entry field. In response to the entry of a handwritten character or symbol, the pen input device converts the entered handwritten character or symbol to a computer text or instruction word. In detail, the pen input device analyzes such a symbol handwritten by the user and converts it to recognition data processable by a computer such as a font symbol, a special character, and a figure. In addition, the pen input device allows the user to determine the attributes and size of the generated entry field.

The pen input device of the present invention enables the user to create a database having a format such as a table, an address book, a schedule, and a household account book made by a word processor, while the form and entry sheets of the database are determined according to the user's desires, without being limited to a specific entry form.

Figure 1:
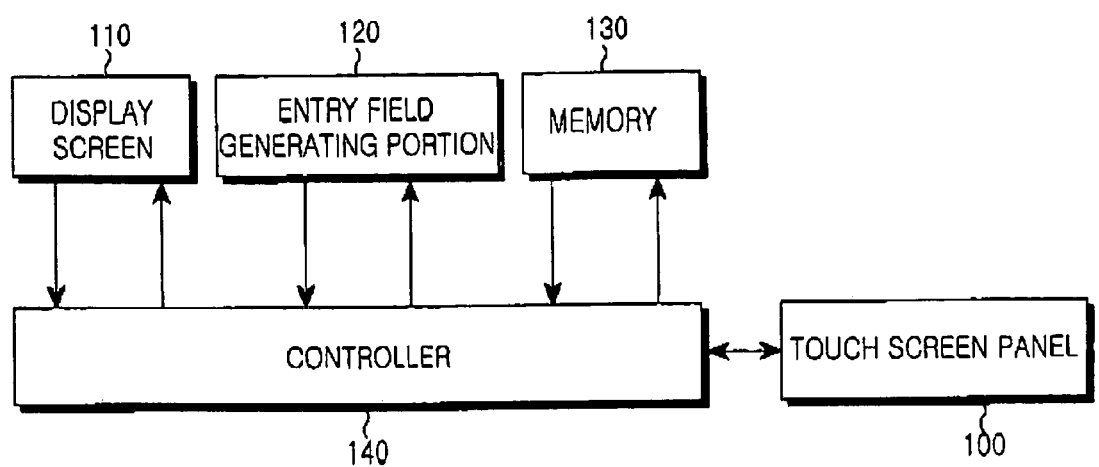
FIG. 1 is a block diagram of a pen input device according to an embodiment of the present invention.

FIG. 1 is a block diagram of a pen input device according to an embodiment of the present invention. Referring to FIG. 1, the pen input device of the present invention includes a display screen 110, an input field generating portion 120, a memory 130, a touch screen panel 100, and a controller 140.

According to the present invention, the touch screen panel 100 provides a user with means for inputting information. The touch screen panel 100 detects various information inputted from the user as pressed points according to its pressure on the panel, and converts the detected information to touch screen panel data. The touch screen panel data is composed of a coordinate data representing the X and Y spatial coordinates of pressed points by the user and a status data indicating if the spatial coordinate data is continuously generated. In addition, the touch screen panel data is configured in a format which the controller 140 can recognize for its processing.

The display screen 110 displays various images or documents under the control of the controller 140. According to the present invention, the display screen 110 displays a boundary line for forming an entry field in accordance with the user's drawing.

The controller 140 controls the overall operation of the pen input device. In addition, the controller 140 forms a new entry field inside a boundary line when the user draws the boundary line having a predetermined shape (e.g., a box) using a pen such as a stylus on the touch screen panel.

More specifically, the controller 140 provides the touch screen panel data from the touch screen panel 130 to the entry field generating portion 120. Upon receipt of the touch screen panel data from the controller 140, the entry field generating portion 120 smoothes the drawn boundary line of the entry field. That is, when the user draws a vertical or horizontal line using a pen but the X or Y coordinate of the beginning point of each line are not equal to the X or Y coordinate of the end point, respectively (i.e., if the user fails to draw an precisely vertical or horizontal line), the entry field generating portion 120 makes the X or Y coordinate of each line to be equal to the X or Y coordinate of the beginning coordinate of each line, respectively. More preferably, it should be understood that a single database can be constructed by processing a table having a completed entry field as one sheet and copying a sheet having an identical form in accordance with a user's request.

Alternatively, referring to data of predetermined shapes stored in the memory 130, the entry field generating portion 120 may provide an entry field having a predetermined shape stored in the memory 130 which matches the shape of the boundary line drawn by the user. For example, the entry field generating portion 120 may create a database having a fixed table form, based on boundary lines obtained by connecting beginning and end points of each stroke along a vertical or horizontal axis.

Upon the receipt of an entry field that is recognizable by a computer from the entry field generating portion 120, the controller 140 enables the entry field to receive a predetermined data input. The controller 140 forms a virtual entry cell corresponding to the entry field, thereby enabling a user to handwrite information inside the entry field using a pen such as a stylus. When the user enters predetermined information such as a character or number into the virtual entry cell, the controller 140 recognizes the entered information and converts it to recognition data that is recognizable by a computer. Alternatively, the controller 140 may provide the entry field as an editable block having a predetermined format. In this case, the user can enter data such as a character or number using a keypad (including a soft keypad). The controller 140 forms one or more databases based on the entry field.

In addition, the controller 140 provides an attribute-determining function to a user for enabling the user to determine the attributes and size of the generated entry field. One of the attributes is the fixedness of the entry field, i.e., the user can set the entry field to be one of a fixed entry field for entering, e.g., a title, an item, and a name or a reserved entry field for user input. Another attribute is the type of the entry data (e.g., an image, a text, and a number). If this attribute (entry data type) of the entry field is determined to one of the image and a corresponding field is set to be a fixed entry field, the virtual cell's size and the recognized handwritten data cannot be modified by the user. If the attribute of the entry field is determined to be the reserved entry field, a user can modify the size and data type at any time. Herein, if the type of a corresponding field is determined, the controller 140 enables only entry of the determined type of data, i.e. one of image, text and numeral. More preferably, it should be understood that a single database can be constructed by processing a table having a completed fixed entry field, reserved entry field and the established type of entry data as one sheet and copying a sheet having an identical form in accordance with a user's request.

The memory 130 stores the database generated according to the present invention. As described above, the memory 130 also stores data necessary for converting a symbol or figure that is handwritten by the user to recognition data recognizable by the computer.

Figure 2:
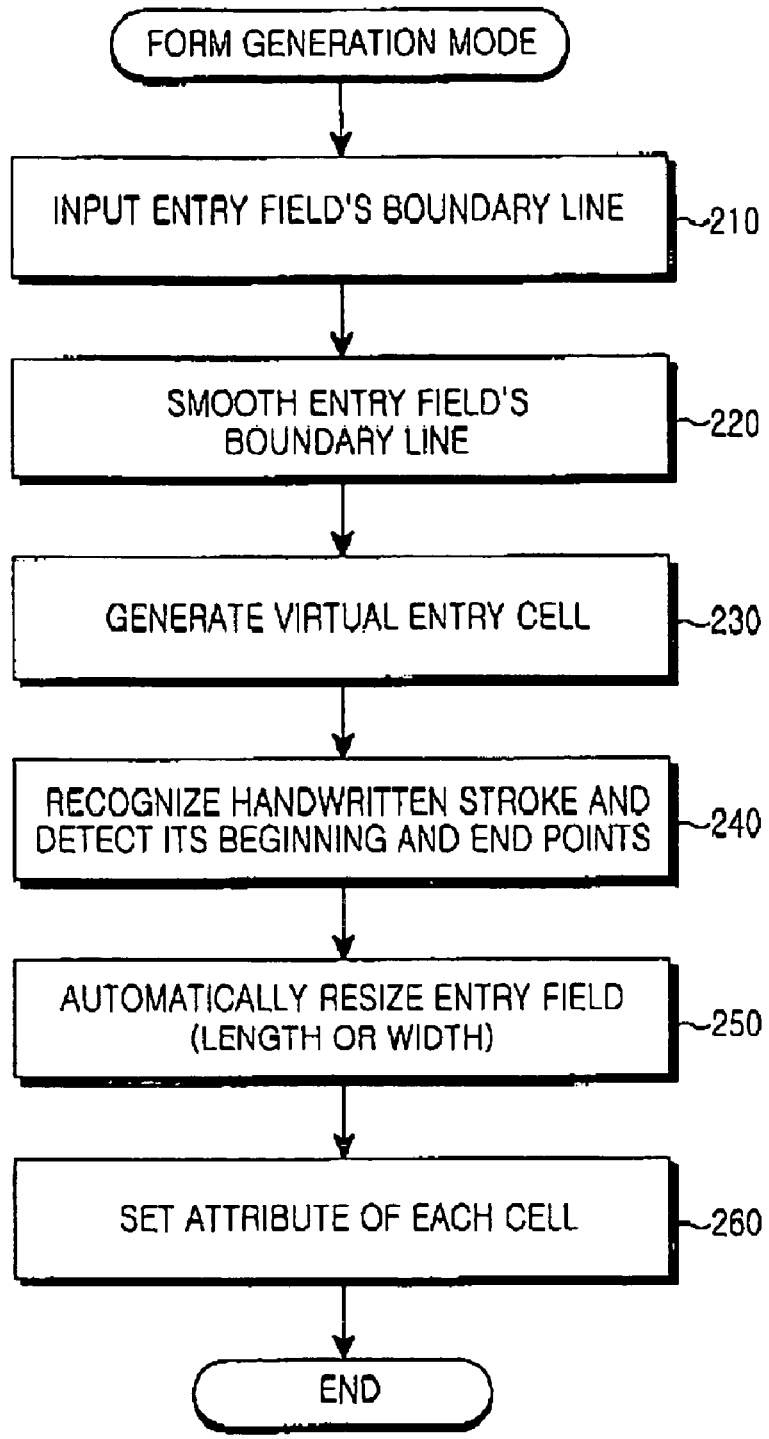
FIG. 2 is a flowchart illustrating a pen input method according to the embodiment of the present invention.
Figure 3:
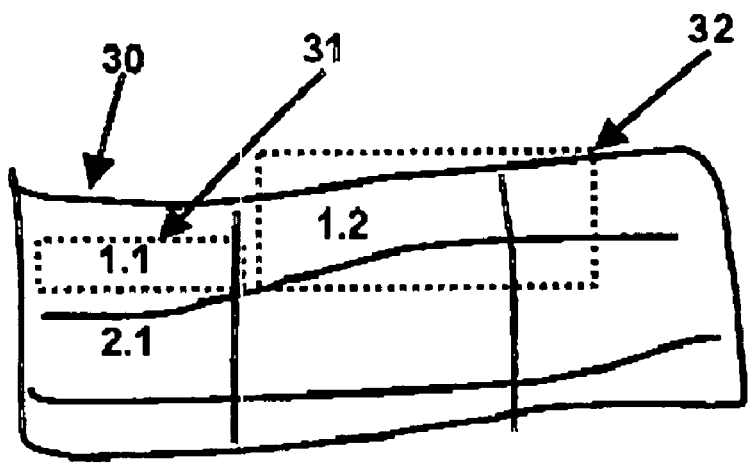
FIG. 3 illustrates generation of an entry field by pen input in accordance with an embodiment of the present invention.

FIG. 2 is a flowchart illustrating a pen input method according to the embodiment of the present invention. FIG. 3 illustrates generation of an entry field by pen input in accordance with an embodiment of the present invention. Referring to FIGS. 1, 2, and 3, in step (210), when a user draws an entry field boundary line (e.g., an elliptical box as shown in FIG. 3, a reference numeral 30) on the touch screen panel 100, the controller 140 of the pen input device provides touch screen panel data corresponding to the drawn boundary line to the entry field generating portion 120. Upon receipt of the touch screen panel data, in step (220), the entry field generating field 120 smoothes the entry field boundary line drawn by the user. Alternatively, referring to data of predetermined shapes stored in the memory 130, the entry field generating portion 120 may provide an entry field having a predetermined shape, which matches the shape of the boundary line drawn by the user, stored in the memory 130. Entry fields generated in such a manner are provided to the controller 140.

In step (230), the controller 140 generates a virtual entry cell for each of the entry fields (as illustrated in FIG. 3, reference numbers 31 and 32). Accordingly, the user can enter handwritten data into the virtual entry cell using a pen such as a stylus. When the user enters handwritten data such as a predetermined character or number into the virtual entry cell, in step (240), the controller 140 recognizes the user's handwritten stroke to detect the stroke's beginning and end points. The controller 140 dynamically modifies the size of the virtual entry cell according to the user's handwritten stroke. The controller 140 recognizes the user's handwritten stroke as one group on the basis of a virtual entry cell unit. Herein, the procedure for the steps 220 and 230 can be alternatively performed in accordance with a slight modification.

In step (240), the controller also converts the recognized handwritten stroke to recognition data recognizable by a computer. Alternatively, the controller 140 may provide the entry field as an editable block having a predetermined format. In this case, the user can enter data such as a character or number using a keypad (including a soft keypad).

When the generated entry field does not have a size sufficient to receive the recognition data recognizable by the computer converted from a character or feature handwritten by the user, in step (250), the controller 140 automatically resizes the entry field. In addition, when the controller 140 provides the entry field as an editable block having a predetermined format and the user enters data using the keypad, if the generated entry field does not have a size sufficient to receive the entered data, in step (250), the controller automatically resizes the entry field. The resizing of the entry field may be implemented by modifying the length and width of the entry field. The resizing of the entry field may also be implemented by modifying the font size of characters set for the entry field.

Subsequently, when the data entry for virtual entry cells is completed, the controller 140 sets the attribute of each of the virtual entry cells in step (260). The controller 140 sets the virtual entry cell to be one of a fixed entry field for entering, e.g., a title, an item, or a name (a reference numeral 1.1. of FIG. 3), and a reserved entry field (a reference numeral 2.1 of FIG. 3) in which an entry space is secured, and determines the type of the entry data such as an image, a text, and a number (a reference numeral 2.2 of FIG. 3). Thereafter, the controller 140 can form one or more databases using a plurality of virtual entry cells generated in such a manner, which include an identical form.

As is apparent from the description above, a data input device and method according to the present invention has advantages in that, because a database having entry fields can be generated by the user's handwritten stroke, there is no need to learn a special application, and the user can create the database while the format of the database is freely determined according to the user's desires.

Although preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the description of the embodiment, but defined by the accompanying claims as well as equivalents thereof.

What is claimed is:

1. A pen input device comprising:
   a touch screen panel for receiving a pen input from a user and displaying input data corresponding to the received pen input;
   an entry field generating portion for generating at least one displayed entry field substantially surrounded by a boundary line when the user draws the boundary line for forming an entry frame;
   a controller for resizing the entry field to be suitable for the input data's size whenever input data is input to the generated entry field, wherein resizing the entry field includes modifying at least one of a displayed length and a displayed width of the entry field; and a memory unit for storing recognition information related to the entry field and the input data.

2. The pen input device as set forth in claim 1, wherein the entry field generating portion generates the entry field by smoothing the boundary line based on a previously stored entry frame shape.

3. The pen input device as set forth in claim 1, wherein the entry field includes a virtual cell with a size that is adjusted to be suitable for the size of the input data.

4. The pen input device as set forth in claim 3, wherein, when the input data is handwritten data, the controller detects a beginning point and an end point of strokes of the handwritten data, and, provides information of a finally modified size of the virtual cell obtained when the end point is detected in the entry field generating portion.

5. The pen input device as set forth in claim 4, wherein the entry field generating portion newly sets the entry field's size based on the information of the finally modified size of the virtual cell.

6. The pen input device as set forth in claim 4, wherein the controller recognizes the handwritten data of the virtual cell as one stroke group, and converts the recognized handwritten data to computer-recognizable data.

7. The pen input device as set forth in claim 1, wherein, in response to a user's request, the controller sets an inherent attribute of a virtual cell of the entry field.

8. The pen input device as set forth in claim 7, wherein the controller duplicates the entry field to generate a page-based database and enables the memory unit to store the page-based database.

9. The pen input device as set forth in claim 7, wherein the inherent attribute defines the entry field to be one of a fixed entry field in which the virtual cell's size and the input data cannot be modified by the user and a reserved entry field in which the virtual cell's size and the input data can be modified by the user, and defines a type of the entry data.

10. The pen input device as set forth in claim 1, wherein the generated entry field is resized according to whether the data input to the generated entry field extends beyond a boundary of the generated entry field.

11. The pen input device as set forth in claim 1, wherein the generated entry field is displayed as an empty entry field.

12. A pen input method comprising the steps of:
(a) generating, when a user draws a boundary line for forming an entry frame through a pen input on a touch screen panel, at least one displayed entry field insidesubstantially surrounded by the boundary line;

(b) generating a virtual cell corresponding to the entry field for entering data;
(c) modifying the virtual cell's size in real time in response to entry of data into the virtual cell; and
(d) when the entry of the data into the virtual cell is completed, resizing the entry field to be suitable for the entry of the data's size, wherein resizing the entry field includes modifying at least one of a displayed length and a displayed width of the entry field.

13. The pen input method as set forth in claim 12, wherein, in the step (a), generating the at least one displayed entry field includes smoothing the boundary line based on a previously stored entry frame shape.

14. The pen input method as set forth in claim 12, wherein, when the data entered into the virtual cell is handwritten data, the step (c) comprises the steps of:
(c1) detecting a beginning point and an end point of the handwritten data;
(c2) modifying the virtual cell's size while displaying a trace of the handwritten data; and
(c3) storing information on the modified virtual cell's size during a period until the end point is detected.

15. The pen input method as set forth in claim 12, further comprising the step of:
(e) in response to a user's request, setting an inherent attribute of the virtual cell of the entry field.

16. The pen input method as set forth in claim 15, wherein the inherent attribute defines the entry field to be one of a fixed entry field in which the virtual cell's size and the entered data cannot be modified by the user, and a reserved entry field in which the virtual cell's size, and the entered data can be modified by the user, and the inherent attribute defines a type of the entry data.

17. The pen input method as set forth in claim 12, further comprising the steps of:
(f) in response to a user's request, duplicating the entry field to generate a page-based database; and
(g) storing the generated page-based database in a memory.

18. The pen input method as set forth in claim 12, further comprising the step of:
(h) recognizing handwritten data entered into the virtual cell as one stroke group, and converting the recognized handwritten data to computer-recognizable data.

19. The pen input method as set forth in claim 12, wherein the generated entry field is resized according to whether the data input to the generated entry field extends a beyond boundary of the generated entry field.

20. The pen input method as set forth in claim 12, wherein the generated entry field is displayed as an empty entry field.

* * * * *